C. BARDELONI.
DEVICE FOR RECEIVING RADIOSIGNALS.
APPLICATION FILED APR. 17, 1920.
1,416,774.
Patented May 23, 1922.
2 SHEETS—SHEET 1.
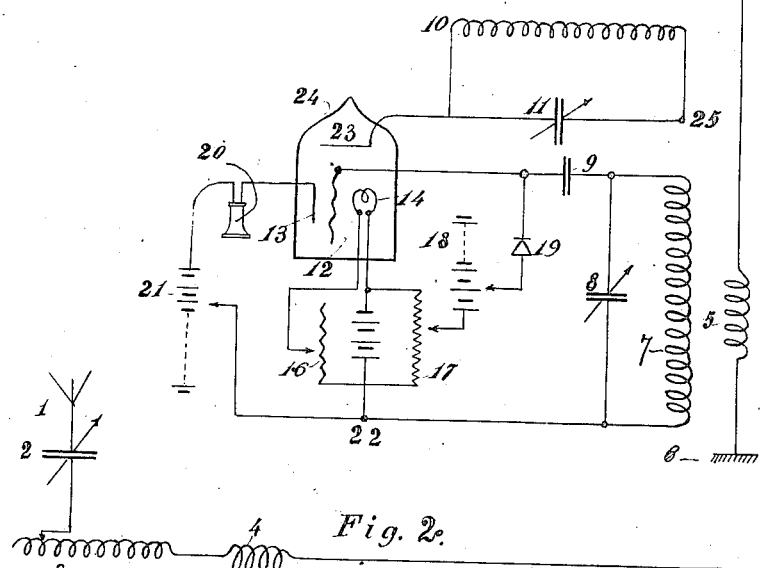
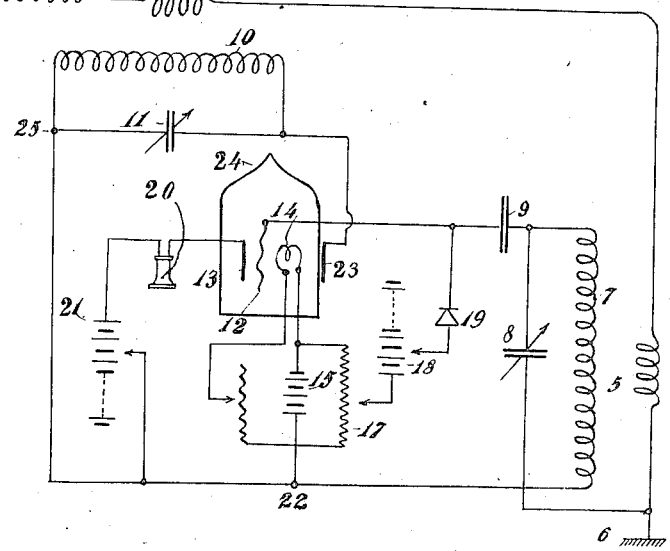
Inventor:
Cesare Bardeloni.
per H. W. Pauker,
Attorney C. BARDELONI.
DEVICE FOR RECEIVING RADIOSIGNALS.
APPLICATION FILED APR. 17, 1920.

1,416,774.

Patented May 23, 1922.
2 SHEETS—SHEET 2.

Inventor
Cesare Bardeloni;
per H. W. Peucker
Attorney

UNITED STATES PATENT OFFICE.

CESARE BARDELONI, OF ROME, ITALY.

DEVICE FOR RECEIVING RADIOSIGNALS.

1,416,774.  Specification of Letters Patent.  Patented May 23, 1922.

Application filed April 17, 1920. Serial No. 374,709.

*To all whom it may concern:*

Be it known that I, CESARE BARDELONI, a subject of the King of Italy, residing at Rome, in the Kingdom of Italy, have invented certain new and useful Improvements in Devices for Receiving Radiosignals, (for which I have filed applications in Italy January 10, 1918; Spain February 2, 1920, and Denmark February 19, 1920,) of which the following is a description.

The present invention refers to improvements in receiving methods of radiotelegraphic and radiotelephonic signals by means of ionized gas detectors with two or more electrodes subject to the action of an ionized medium, together with a contact having a rectifying action on currents of variable direction or any other device acting in the same manner, both suitably arranged in oscillating circuits of the kind used for radiotelegraphic or radiotelephonic reception and suitably connected to convenient sources of electric energy.

The object of said improvements is to utilize the ionized gas detector, as above mentioned, not only in its characteristic action as a current rectifier and amplifier, as well as a generator of persistent oscillations, peculiar to such detectors, but also in such a way that the ionized gas detector and the rectifying device cooperating for the reception of signals, differentiate their actions so as to obtain in the above mentioned reception the elimination of disturbing oscillations, such as might be caused by other radiotelegraphic or radiotelephonic transmissions employing a slightly different wave length, or at least to lessen as much as possible the disturbances caused in the reception by atmospherical electric discharges "straywaves" or "statics" as they are called, or by any other disturbing causes of electromagnetical nature to which the receiver is responsive.

Such a result is obtained, according to the present invention, by adding to the usual closed oscillating circuit of the receiving plant to which the rectifying contact and the audion grid are connected, a second closed oscillating circuit, electromagnetically or electrostatically coupled to the aerial and connected, if so required, with a second collecting plate of the audion, and working in such a manner as to eliminate (when the second named oscillating circuit is conveniently tuned) the propagation, through the first collecting plate of the audion connected to the receiving telephone apparatus, of the disturbing currents to be excluded.

The second above mentioned circuit may be regulated in such a way as either to wholly exclude, or at least to weaken the effects due to signals having a wave length greater or smaller than the one which must be received. If it is desired to exclude at the same time longer and shorter waves, two auxiliary circuits are used, ending or not in two collecting plates, and both coupled to the aerial and tuned in such a manner as to eliminate one the disturbances due to waves having a greater length and the other the disturbances due to waves of smaller length.

In the drawing attached hereto:

Fig. 1 shows schematically the electrical connections in one of the receiving stations supplied with a rectifying contact and with the auxiliary circuit in accordance with the invention.

Figs. 2 and 3 are modifications of the arrangement shown at Fig. 1.

Figure 3:
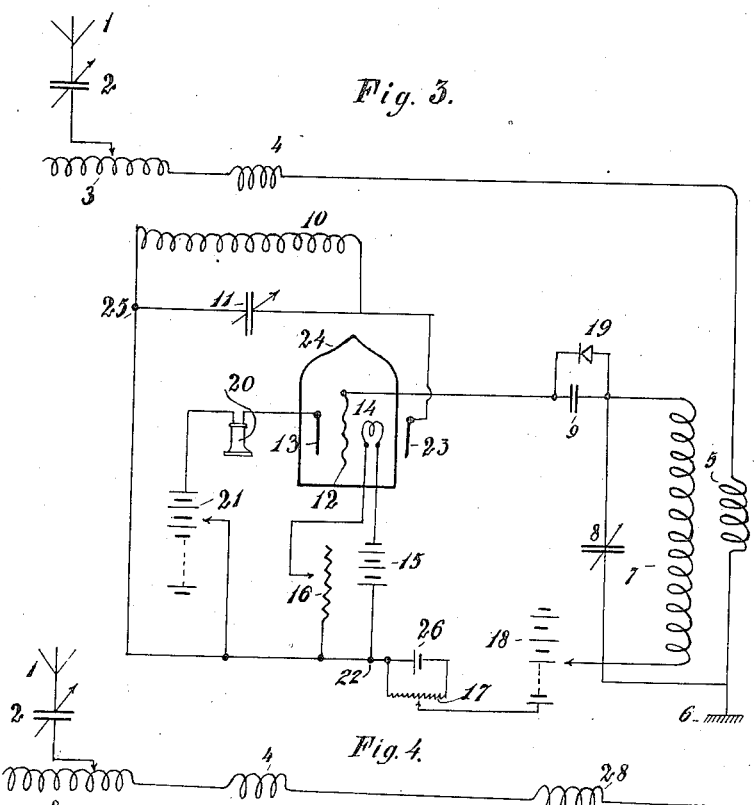

In Fig. 1, 1 is the aerial in which are inserted a condenser 2 and an inductance 3 both adjustable at will. The aerial is inductively coupled in 4 to the inductance 10 of an oscillating closed circuit comprising the said inductance and an adjustable condenser 11. By means of a second inductive coupling it is then coupled in 5 to another closed oscillating circuit comprising the inductance 7 and a condenser 8 of variable capacity. The aerial through the coils of couplings 4, 5 is earthed at 6.

To one of the armatures of the condenser of said second closed oscillating circuit is connected one of the armatures of a fixed condenser 9 the other armature of which is in communication with the grid 12 of a thermionic lamp or valve such as an audion and a carborundum contact, or any other type of current rectifier and detector 19 which is also adjustably connected with a battery of cells 18 and through said battery, with the gliding contact of a potentiometer 17 shunted across the terminals of the battery of accumulators or cells 15; through said battery and the rheostat 16 a current is supplied to the incandescent filament 14 of the audion.

Plate 13 of the audion is connected with one terminal of the telephone receiver 20 the other terminal of which is connected with the positive pole of an adjustable battery of cells 21 connected, by means of a gliding contact, to the positive pole of the battery which feeds the filament. The closed oscillating circuit 10, 11, which will be hereafter called "the epurator," has one of the plates of its adjustable condenser connected to a collecting plate 23 placed, together with the other cold electrode 13 and grid 12 of the audion, and the incandescent filament 14, within the glass bulb 24 so as to receive in a direct manner a share of the stream of the electrons emanating from the incandescent filament.

On the whole therefore the arrangement described comprises an ordinary audion receiving circuit, to which is added a second closed oscillating circuit 10, 11 coupled, like the first, to the aerial and communicating with a suitably-shaped conductor reaching in the ionized space of the audion, as well as a circuit 17, 18, 19, including a current detector and rectifier suitably connected to the circuit for the usual audion reception.

Upon having tuned the aerial and the oscillating circuit 7, 8 for the wave length to be received and suitably set in the right position the rectifier and detector 19, in such a manner that in the same instant the grid 12 of the audion and the conductor 23 added to the audion may be charged to potentials of a contrary name, (which is obtained besides setting the rectifying detector in its right position by regulating also in a convenient manner the potential upon battery 18 and potentiometer 17). In case the signals to be received be disturbed by others transmitted with oscillations of a wave length not too different from that for which the plant is tuned, it will suffice to bring into resonance the epurating circuit 10, 11 with the disturbing oscillation and, without modifying in any way the tuning of the aerial, to couple it to the said circuit, through coupling 4 until the disturbing influence disappears.

As is well known, the action of the grid is to increase the plate-current when the grid is charged to a positive potential and to decrease this current when the potential of the grid becomes negative. The lamp is worked in the range below the knee of the characteristic curve of the current flowing between plate and filament, or, in other terms, the lamp is working in the best conditions to detect an oscillating current.

Bridging the oscillating circuit connected to grid and filament is, in my device, a rectifier of alternating currents, whose action is to absorb a portion or the total of the positive wave coming onto the grid from the oscillating circuit, so that, during the oscillation of the said circuit, the grid of the lamp works only under the influence of the negative waves, which decreases the plate-current.

When the additional electrode is negatively charged its action is to increase the number of electrons flowing between filament and plate, which is opposite to the particular conditions of working between the grid and the rectifier. When the additional electrode is positively charged its effect is immaterial because it is not interposed between the filament and the plate.

By means of the potentiometer or the variable E. M. F. in series with the rectifier, the rectifier itself can be regulated to render the particular grid action much more strong for one of two radio transmissions simultaneously impinging on the antenna, one of which is to be received, even if the two transmissions have the same wave length.

By means of the rectifier it is possible to increase the effect of the signals it is desired to receive, and by suitably coupling the aerial to the oscillating system, tuned to the disturbing transmission, it is possible completely to annul it.

Of course, this result is more easily realized if the two transmissions have different wave lengths.

For the above reasons, the effect of atmospheric discharges acting on the antenna and the coupled oscillating circuits of the same oscillating period as the antenna itself, can be annulled by employing this device in the reception of radiotelegraphic and radiotelephonic signals.

However, as atmospheric discharges have not usually a constant amplitude like wireless transmissions, it is always possible that some of them of a very great strength compared with the signals to be received may influence the grid, in which case the disturbance would be reduced but not entirely eliminated.

Should the disturbance be caused by atmospherical electrical discharges it will be sufficient to tune the selecting circuit to a wave length either a little greater or a little smaller than that of the signals required and, thereon, to couple said circuit with the aerial until the disturbing influence of said discharges be attenuated as much as possible, still allowing a very good reception of the signals.

It will be seen that the differentiating action with regard to the signals exercised by the grid 12 of the audion and by the conductor 23, acting together for the elimination of disturbances, is assisted by the selective action which is peculiar to the rectifying contact.

In fact the reinforcement of the signals produced by said contact, thus inserted into the receiving circuit of the audion, is different in intensity according to the quantity of electrical oscillating energy which arrives to the contact in the unit of time. In consequence, by operating only the potentiometer 17, it is possible to give a greater relief to a given radio transmission in comparison with two others which either owing to the length of the waves being different from the former or owing to a different musical pitch, carry to the receiving circuit of the audion a quantity of oscillating energy (for unit of time) different from that carried by the transmission upon which the critical potential upon the rectifying contact has been regulated.

Just for this reason, besides the possibility of attenuating the disturbances in the best way by making use of the device above described, said attenuation can also be secured without making use of conductor 23 added to the audion, by profiting by the absorbing action of the aerial produced by the epurating circuits closed on themselves (as in Fig. 1) together with the selective action of the rectifying contact.

By means of such arrangement it is possible, without appreciable diminution in the intensity of reception of the signals emitted by a given transmitting station, to eliminate the disturbing influence produced by the signals of another station transmitting at the same time, and employing, as the first, slightly damped oscillations having a wave only 4% longer or shorter than the wave for which the station is prepared.

Hence it ensues that its adoption allows of a much greater extension of the applications of radiotelegraphy, up to this time limited by the impossibility of practically eliminating the disturbances of the reception produced by other stations operating with only slightly damped oscillations having a wave length differing at least about 15%, though taking advantage, as far as possible, of the phenomena arising from the tuning of the circuits.

Of course the aforementioned percentages refer to equal quantities of electrical energy set up in the receiving aerial either from the corresponding or from the disturbing station and this both in the case that the two stations transmitting contemporaneously be of about equal power and equally distant from the receiving station as in the case in which, as they are of a greatly different power, the more powerful one be so far from the receiving station as to produce on the aerial of the latter effects almost equal to those of the nearest transmitting station.

Hence it follows that by adopting the aforedescribed arrangement, a station, even of rather considerable power, near the receiving station, may be inoperative upon the aerial of the latter tuned for the length of wave of a distant station, when the difference of the two wave lengths be such that, for the effects of syntony, the quantities of electrical energy corresponding to them and set up contemporaneously on the receiving aerial, be about the same; a result which by the means known up to this day was not possible to obtain.

With regard finally to the disturbances originating from atmospherical electric discharges, notoriously constituted by greatly damped oscillations, their exclusion or reduction is yet sufficiently easy in consideration of the fact that it is not necessary to tune the epurating circuit very closely to the period for which the receiving circuit is tuned, therefore it is possible to maintain for the signals to be received a good intensity, practically securing at the same time the result of rendering them less disturbed by the atmospherical discharges.

Naturally the arrangement described and illustrated in Fig. 1 is but one manner of carrying into practice the present invention, for the same results may be obtained by arranging the various receiving and epurating devices in a way different from that already pointed out. And thus, as shown in Fig. 2, the epurating and the receiving circuits may be connected between 25 and 22; the receiving circuit further may be connected at 6 with the aerial circuit. Plate 23 of the epurating circuit, instead of within the bulb 24, can be applied also without adhering to the glass of the bulb, and placed in such a way so as to directly receive through the glass the stream of the electrons emanating from the filament.

Thus also the reinforcing circuit 17, 18, 19 can be subdivided into different sections by placing for instance, contact 19 in parallel with condenser 9 (Fig. 3) by varying the value of the potential supplied by battery 18 through a sliding contact connected to the receiving oscillating circuit and obtaining the fractions of the voltage corresponding to one cell element by means of a potentiometer 17 shunted across the terminals of a cell element suitably connected to the feeding battery of the filament.

It is further obvious that the coupling between the epurating circuit and the aerial, instead of being magnetic, can be electrostatical and effected in any of the known ways.

Now it is finally to be considered the case that the correspondence with a given radiotelegraphic or radiotelephonic station be disturbed by two other electromagnetical transmissions, one with a wave slightly shorter, the other with a wave slightly longer than the wave which must be received.

Figure 4:
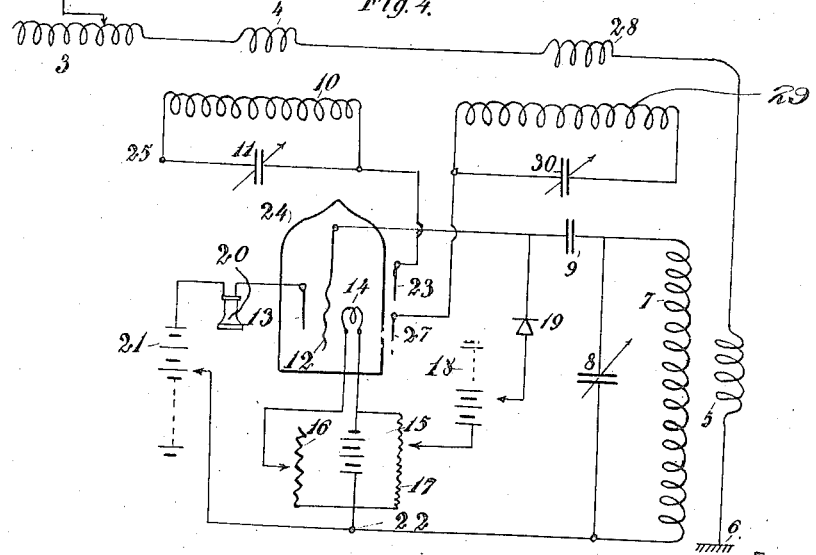
Fig. 4 shows schematically the connections when two auxiliary circuits are used.

By extending to this case the principle upon which the present invention rests, it is possible to obtain the result of insulating from the others the transmission of the corresponding station, by means of two epurating circuits as above described and cooperating with the same receiving audion as it appears for instance, from Fig. 4.

In the scheme shown in said figure the numerals from 1 to 25 indicate the same parts already appearing in the previous figures: 29, 30 is the second epurating circuit connected with the plate 27 (which can be either inside or outside the bulb) as already stated and coupled in 28 to the circuit of the aerial.

By tuning the two epurating circuits, one to the shorter and the other to the longer disturbing waves, and by suitably coupling them to the aerial, it is possible to isolate in the receiving circuit the wave of intermediate length which it is sought to receive.

It is evident that there, as a general rule, cannot be needed more than two epurating circuits for they, already respectively tuned with the nearest longer and shorter wave, and which by being the nearest to the transmission wave, in a general way, cause the most considerable disturbance, said transmission wave of intermediate length will remain much better protected against the disturbing action occasionally occurring, of other waves more different in length, or of atmospheric discharges generating strongly damped oscillations.

All the above said about the reception of damped oscillations applies of course, and even more conspicuously, to the reception of persistent oscillations disturbed by other persistent oscillations as well as to the case of persistent oscillations disturbed by damped ones.

Besides the above said about the action of the device for the attenuation of disturbing factors, it may be not amiss to add here that the same device is also capable of reinforcing the electromagnetical signals received, for which purpose it is sufficient to reverse the action of the current rectifier 19, to adjust the potential of battery 18, and to tune the epurating circuit or circuits exactly for the oscillation which must be received, after having coupled them to the aerial.

Therefore the arrangement described allows also the whole utilization of the characteristical action of a usual audion detector permitting, if so required, to use the whole electronical energy supplied by the incandescent filament and which in a greater or smaller part, according to the type of the audion employed, gets dispersed in the ordinary ionized gas receivers.

Claims:

1. Device for receiving radiotelegraphic and radiotelephonic signals, comprising an aerial, an adjustable main oscillating circuit containing a lamp with a hot filament as cathode, a grid, and a plate, said circuit being suitably coupled to the aerial, and connected at one side to the grid and on the other side to the hot cathode of the lamp, a rectifier of variable currents connected to said circuit on the same side as the grid and hot cathode of the lamp, a receiving and hot cathode of the lamp, a receiving telephone in circuit with the plate of the lamp, and an auxiliary oscillating system which is also adjustable and suitably coupled with the aerial, said system comprising means so located relatively to the lamp that the oscillations of said system influence the electron stream of the lamp.

2. A device according to claim 1 wherein the auxiliary oscillating system comprises two closed oscillating circuits, both of them suitably coupled to the aerial and each one connected with an electrode adapted to act on the electron stream of the lamp.

3. A device according to claim 1 wherein the auxiliary oscillating system comprises an electrode placed within the bulb of the lamp.

4. A device according to claim 1 comprising a potentiometer shunted across the terminals of the source of electric energy feeding the hot cathode of the lamp and an additional adjustable source of electromotive force inserted between the rectifier and the potentiometer.

5. A device according to claim 2 comprising a potentiometer shunted across the terminals of the source of electric energy feeding the hot cathode of the lamp and an additional adjustable source of electromotive force inserted between the rectifier and the potentiometer.

6. A device according to claim 1 comprising a potentiometer and an additional adjustable source of electromotive force in series with the rectifier, the latter with its sources of potential being connected in shunt with the main oscillating circuit, and also in shunt with the circuit through the internal ionized space of the lamp.

7. A device according to claim 2 comprising a potentiometer and an additional adjustable source of electromotive force in series with the rectifier, the latter with its sources of potential being connected in shunt with the main oscillating circuit, and also in shunt with the circuit through the internal ionized space of the lamp.

In testimony whereof I have affixed my signature in the presence of two witnesses, this 24th day of March, 1920.

CESARE BARDELONI.

Witnesses:
LETTERN LABOUTTA,
GUIDO CASSAGUERIJ.